US011106870B2

(12) United States Patent
Jankowski et al.

(10) Patent No.: US 11,106,870 B2
(45) Date of Patent: Aug. 31, 2021

(54) INTELLIGENT TEXT ENHANCEMENT IN A COMPUTING ENVIRONMENT

(71) Applicant: INTERNATIONAL BUSINESS MACHINES CORPORATION, Armonk, NY (US)

(72) Inventors: Julia Jankowski, Releigh, NC (US); Taylor Presley, Raleigh, NC (US); Kaleigh E. Williams, Raleigh, NC (US); Elizabeth C. Huntley, Raleigh, NC (US); Cheranellore Vasudevan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 16/115,230

(22) Filed: Aug. 28, 2018

(65) Prior Publication Data
US 2020/0073936 A1    Mar. 5, 2020

(51) Int. Cl.
*G06F 40/30* (2020.01)
*G06N 20/00* (2019.01)
*G06F 16/33* (2019.01)
*G06F 40/279* (2020.01)

(52) U.S. Cl.
CPC .......... *G06F 40/30* (2020.01); *G06F 16/3344* (2019.01); *G06F 40/279* (2020.01); *G06N 20/00* (2019.01)

(58) Field of Classification Search
CPC .... G06F 40/109; G06F 40/253; G06F 40/103; G06F 16/637; G06F 40/10; G06F 40/166; G06F 40/20; G06F 40/30; G06F 16/3344; G06F 40/279; G06N 20/00
See application file for complete search history.

(56) References Cited

U.S. PATENT DOCUMENTS

| 9,633,008 | B1* | 4/2017 | Brand ..................... G06F 40/30 |
| 2004/0082839 | A1* | 4/2004 | Haugen ................. A61B 5/165 600/300 |
| 2005/0075880 | A1* | 4/2005 | Pickover ............... G06F 40/253 704/270 |
| 2005/0188330 | A1 | 8/2005 | Griffin |
| 2008/0082613 | A1 | 4/2008 | Szeto et al. |
| 2010/0268682 | A1 | 10/2010 | Lewis et al. |
| 2011/0294525 | A1 | 12/2011 | Jonsson |
| 2012/0047447 | A1* | 2/2012 | Haq ..................... G06F 3/04847 715/752 |
| 2012/0260188 | A1* | 10/2012 | Park ....................... H04L 51/32 715/739 |
| 2013/0124962 | A1* | 5/2013 | Mitchell ............... G06F 40/103 715/229 |
| 2013/0346067 | A1 | 12/2013 | Bhatt |
| 2015/0100537 | A1 | 4/2015 | Grieves et al. |

(Continued)

*Primary Examiner* — Wilson W Tsui
(74) *Attorney, Agent, or Firm* — Griffiths & Seaton PLLC

(57) ABSTRACT

Embodiments for intelligent text enhancement in an Internet of Things (IoT) computing environment by a processor. One or more contextual factors relating to text data in a communication may be interpreted to identify a mood/sentiment of the user prior to the user sending the communication to one or more persons using one of a plurality of applications. A text font matching the one or more contextual factors may be suggested in the communication.

15 Claims, 6 Drawing Sheets

(56) References Cited

U.S. PATENT DOCUMENTS

| | | | | |
|---|---|---|---|---|
| 2015/0222586 A1* | 8/2015 | Ebersman | ............... | H04L 51/02 |
| | | | | 715/752 |
| 2016/0147731 A1 | 1/2016 | Parikh et al. | | |
| 2017/0308290 A1* | 10/2017 | Patel | ................... | G06F 3/04886 |
| 2017/0364484 A1* | 12/2017 | Hayes | ..................... | G10L 25/63 |
| 2018/0101599 A1* | 4/2018 | Arnold | ................. | G06F 40/274 |
| 2018/0285592 A1* | 10/2018 | Sharifi | ................ | G06F 21/6245 |

\* cited by examiner

INTELLIGENT TEXT ENHANCEMENT IN A COMPUTING ENVIRONMENT

BACKGROUND OF THE INVENTION

Field of the Invention

The present invention relates in general to computing systems, and more particularly, to various embodiments for intelligent text enhancement in an Internet of Things (IoT) computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products.

As great strides and advances in technologies come to fruition, the greater the need to make progress in these systems advantageous for efficiency and improvement such as, for example, using the vast amount of available data for assisting in improvements to the quality of life and appropriate living accommodations.

SUMMARY OF THE INVENTION

Various embodiments of a cognitive system for text enhancement in an Internet of Things (IoT) computing environment by a processor, are provided. In one embodiment, by way of example only, a method for intelligent text font formatting in a computing environment, again by a processor, is provided. One or more contextual factors relating to text data in a communication may be interpreted prior to the user sending the communication to one or more persons using one of a plurality of applications. A text font matching the one or more contextual factors may be suggested in the communication.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
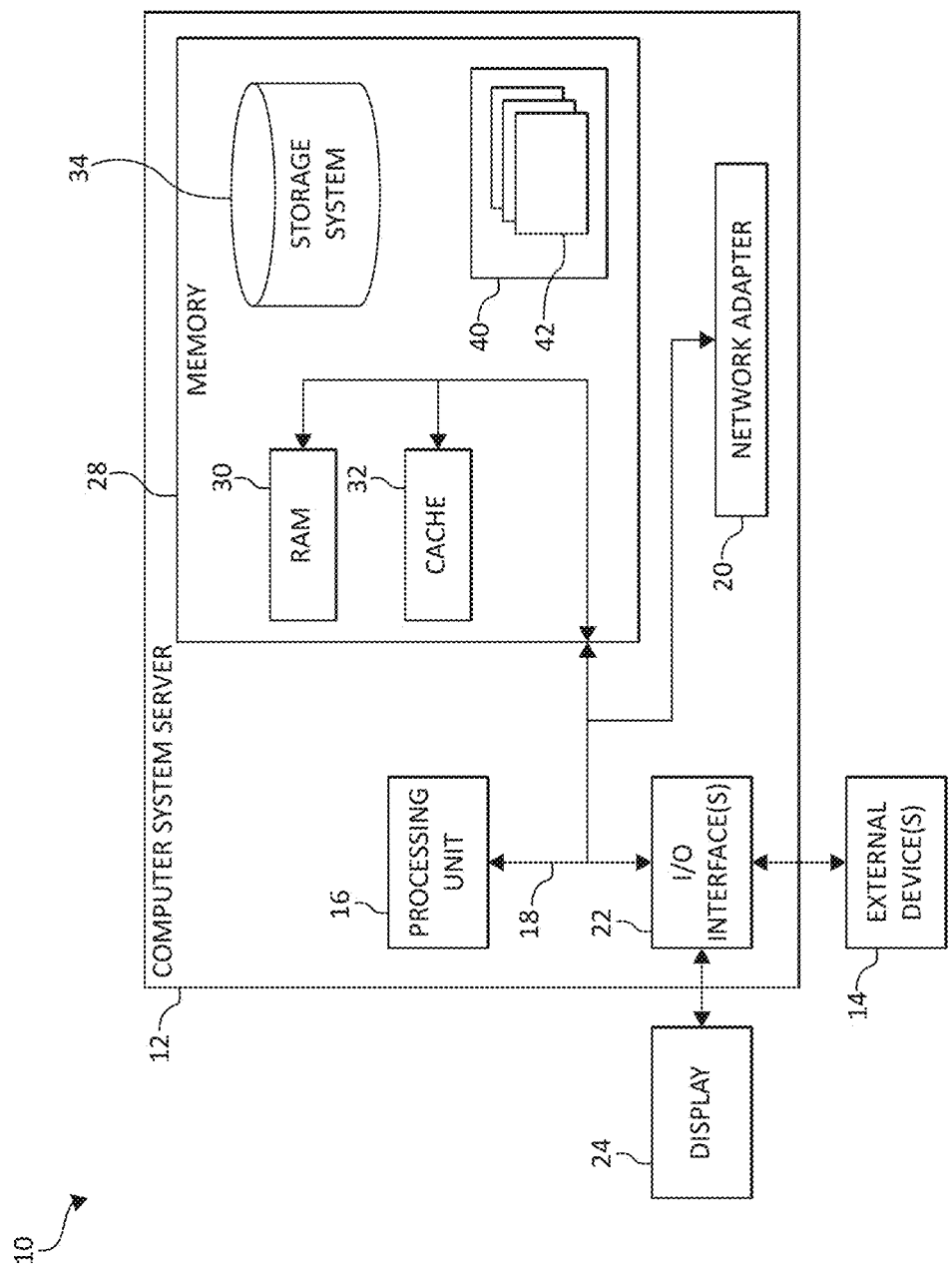
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

Currently, a wide variety of computing devices (e.g., computers, laptops, wireless communication devices, IoT device, etc.) are used for communicating with one or more other parties such as, for example, by sending emails, text messages, and even posting a communication message on a social media account. Text messages and communications from these digital computing devices is often times bland, simple, commonly used, and/or lack the appropriate mood or emotion of one or more users. Moods and tones are often lost in a basic text font (which may be a default text of an IoT device) of a communication that may be sent between communicating parties. This lack of feeling and sentiment often times creates unnecessary tension, confusion, and overall miscommunication. Thus, a need exists for providing an intelligent text font formatting service.

In one aspect, the present invention provides for a cognitive system that provides intelligent text font formatting in an IoT computing environment. One or more contextual factors relating to text data in a communication may be cognitively interpreted prior to the user sending the communication to one or more persons using one of a plurality of applications. That is, the contextual interpretation leads to identification of the mood/sentiment of the user. A text font matching the one or more contextual factors may be suggested in the communication.

The intelligent text font formatting operation may take into consideration the textual sentiment and phrases and suggest an appropriate text font associated with the predicted sentiment. The sentiment may represent a tone of the user and an emotional state of the user (e.g., polite, aggressive, neutral, happy, sad, angry, etc.). A specific emotional state (e.g., polite, aggressive, neutral, etc.) may be described as a sentiment type. For example, if a text message that was sent to a friend that says, "Stay classy my friend," the intelligent text font formatting operation may suggest a cursive text font. Also, if a communication message includes text data that states "No, absolutely not," a bold, dramatic font may be suggested. Alternatively, if a user enters into a smart phone the phrase "hi," the intelligent text font formatting operation may suggest an emoji of a waving hand to appear. In this way, the intelligent text font formatting operation counteract normal, basic communication described above.

In addition, the intelligent text font formatting operation also provides an enhancement feature by actually interpreting a sentiment of the text data (e.g., tone, mode, emotional state, etc.) and suggests one or more additional and/or new text fonts/formats (e.g., Times New Roman, Courier, Cursive, Helvetica Bold, etc.). The intelligent text font formatting operation may emphasize a particular word, phrase, or message and may create, replace, and/or enhance the current text font with a suggested text font(s) that matches the particular sentiment. One or more types of communication messages (e.g., social media posts/accounts, blogs, emails, text message data, etc.) may be parsed and analyzed to identify both one or more contextual factors and/or current and/or traditional static text lacking in aesthetics for a particular context. One or more suggestions of intelligent text fonts may be automatically applied to the communication message and be presented in different colors, sizes, and style to create a dynamic, and/or enhanced communication message reflective of the user's tone, emotion, sentiment, and/or preferences.

In an additional aspect, the intelligent text font formatting operation may take into consideration the tone, sentiment, feelings, and/or phrases used through text messages, emails, social media posts/messages and/or other forms of communications. A natural language processing ("NLP") operation may be used to determine tones, sentiments, emotions, feelings, and/or phrases of the text. Based on the determined tones, sentiments, emotions, feelings, and/or phrases of current text in a communication (which has not been communicated to a third party), the intelligent text font formatting operation enables one of a variety social media applications to automatically create a text font that matches the text for the user to use if they wanted to add a customized effect.

The so-called "appropriateness" of a suggested text font from the intelligent text font formatting operation may be subjective and context dependent. For example, one solution for a suggested text font to replace a current text font in text data may be interpreted and evaluated to be either satisfactory or unsatisfactory depending on the tone, sentiment, and/or feeling in the text data and/or also depending on a user profile/biometric data/facial expressions of each user. Accordingly, the so-called "appropriateness" of a particular text font of text data may depend greatly upon contextual factors, such as a tone, emotion, sentiment, user profile, environmental factors, status of a recipient, and other contextual factors. Also, the so-called "appropriateness" of a particular text font of text data may be determine based on facial expression. For example, if a tone does not match a user's facial expression, the particular text font is determined as inappropriate. A deeper, cognitive analysis of the user may be provided to further understand the user and/or interpret the appropriate level of text data/font.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
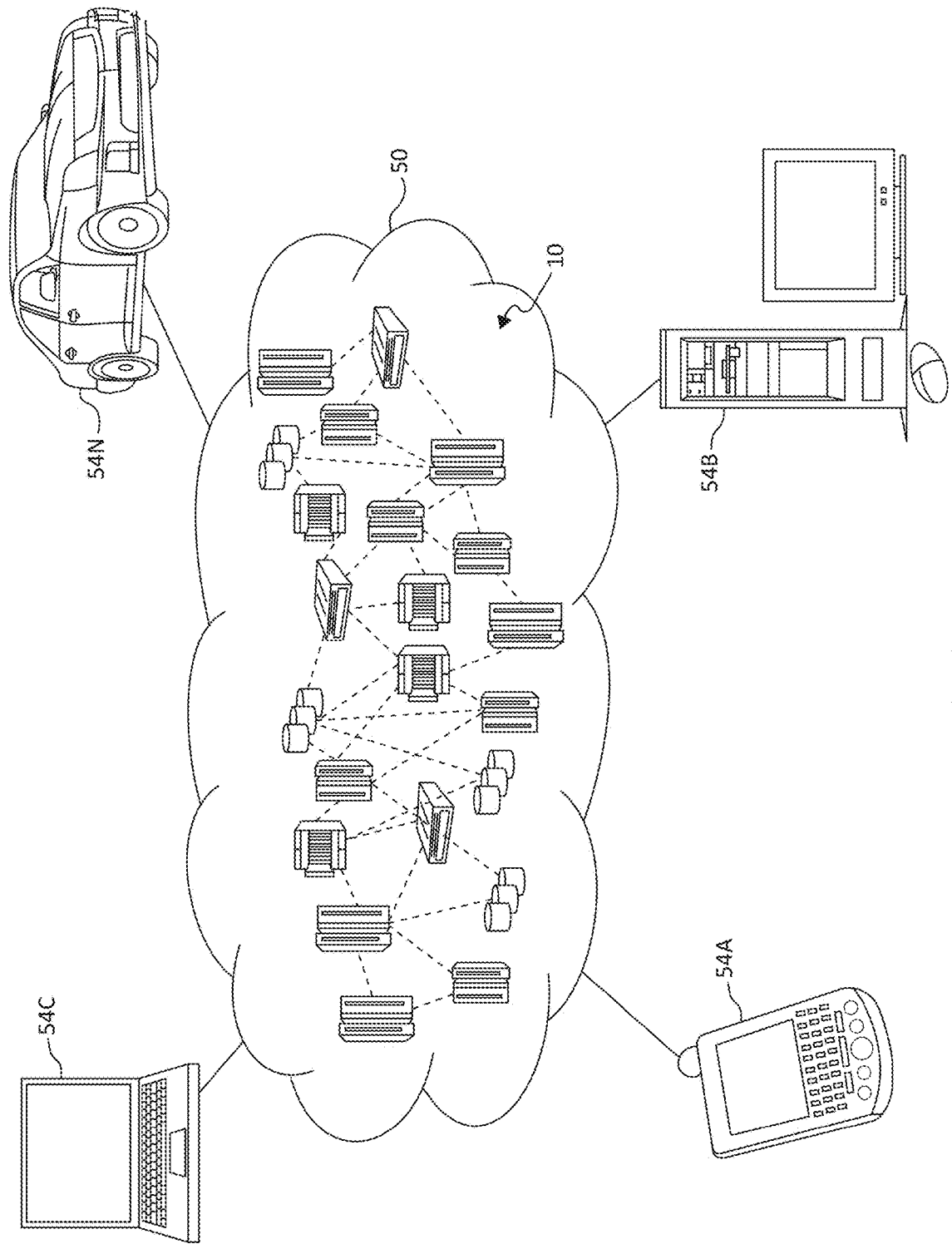
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
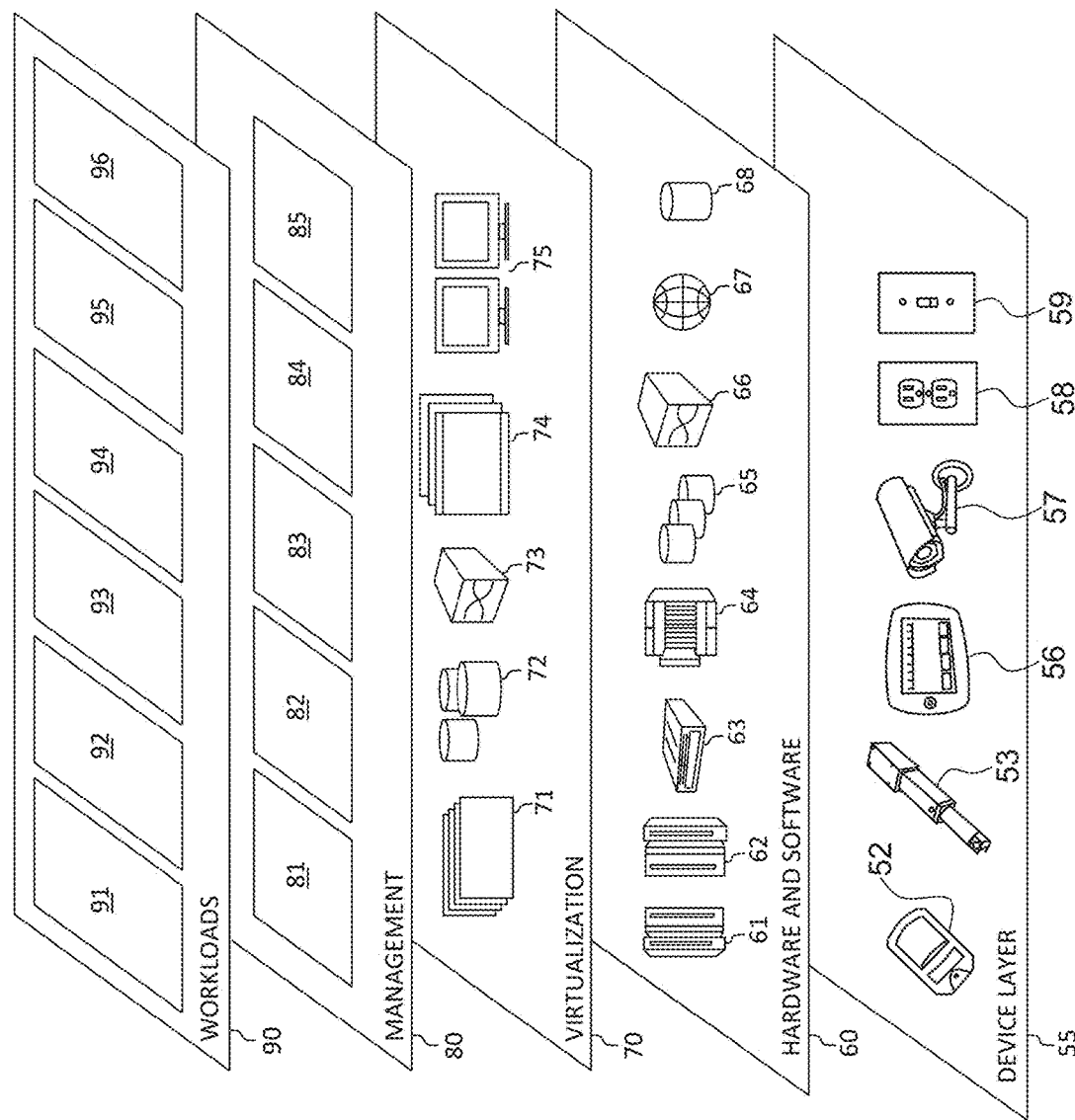
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent text font formatting. In addition, workloads and functions 96 for intelligent text font formatting may include such operations as data analysis, machine learning (e.g., artificial intelligence, natural language processing, etc.), user analysis, analysis of associates of a user, as will be further described. One of ordinary skill in the art will appreciate that the workloads and functions 96 for intelligent text font formatting may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As stated above, the present invention provides a novel solution of intelligent text font formatting. The intelligent text font formatting operation allows for an entirely new perspective to communicating with other parties (e.g., friends, family, associates) by personalizing one or more element of the text font of a communication message.

Figure 4A:
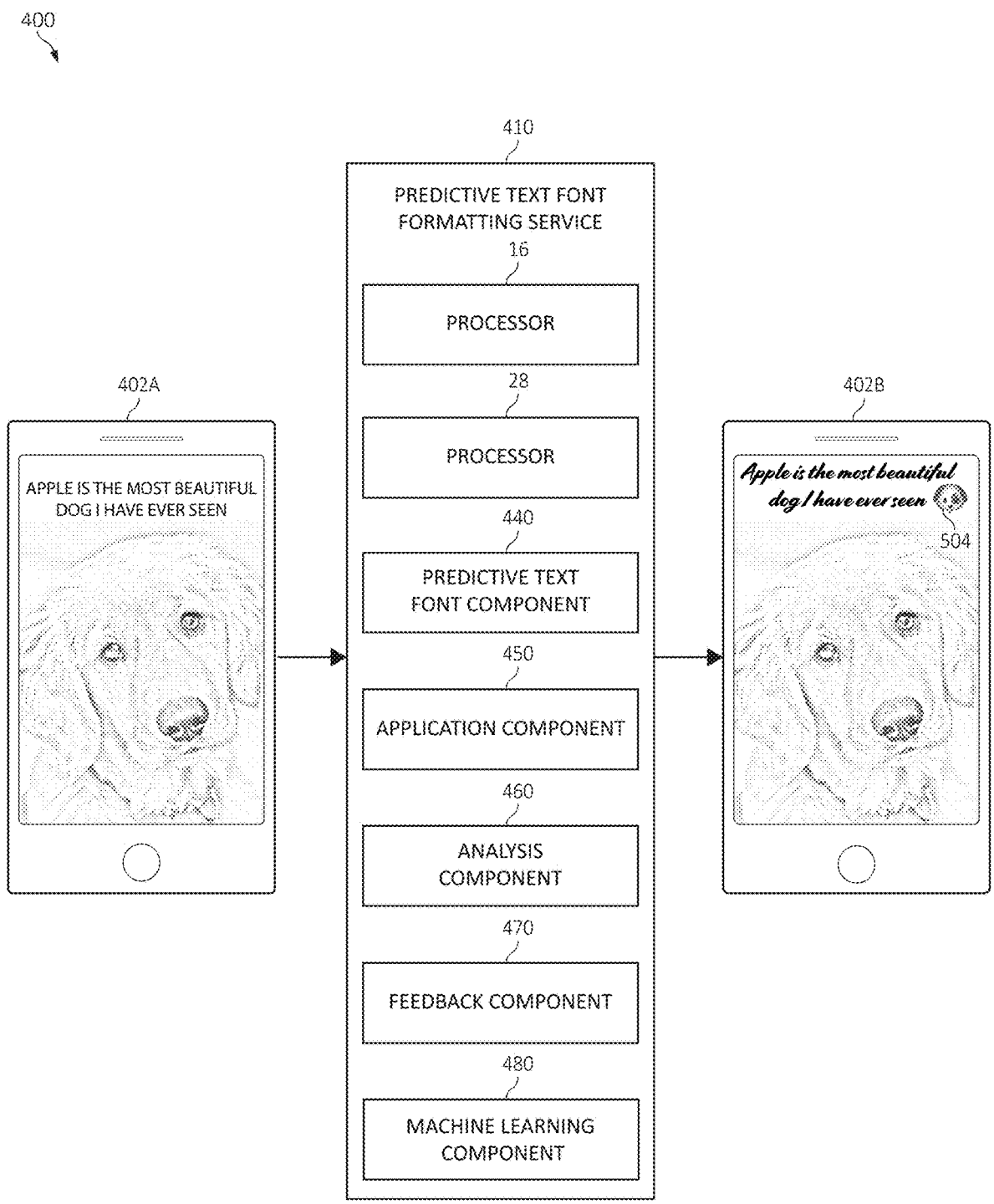
FIG. 4A is an additional block diagram depicting an exemplary functional relationship between various aspects of the present invention.
Figure 4B:
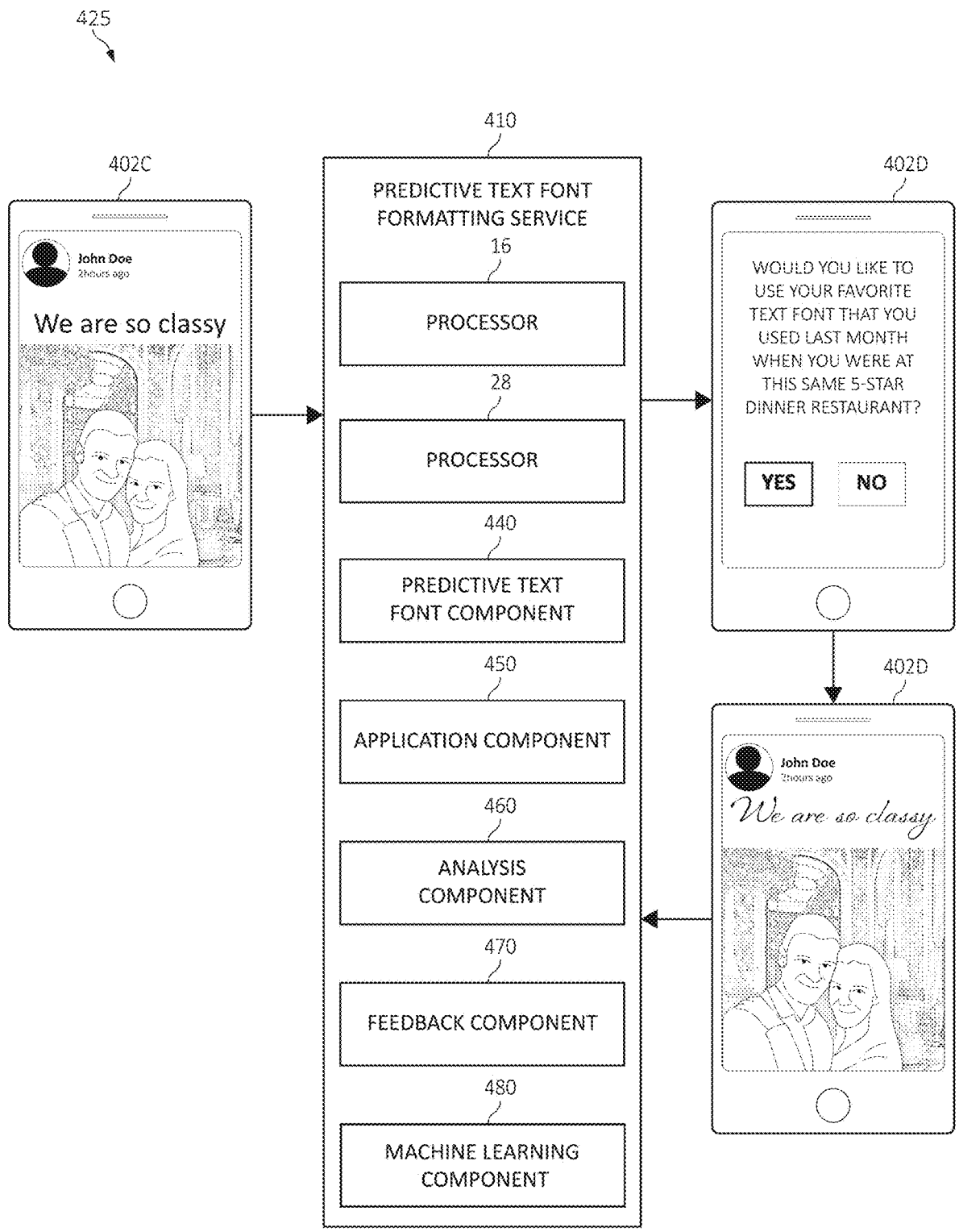
FIG. 4B is an additional block diagram depicting an exemplary functional relationship between various aspects of the present invention.

Turning now to FIGS. 4A-4B, a block diagram depicting exemplary functional components 400, 425 according to various mechanisms of the illustrated embodiments is shown. FIG. 4 illustrates systems 400, 425 for intelligent text font formatting in an IoT computing environment. As will be seen, many of the functional blocks may also be considered "modules" or "components" of functionality, in the same descriptive sense as has been previously described in FIGS. 1-3. With the foregoing in mind, the module/component blocks 400 and 425 may also be incorporated into various hardware and software components of a system for cognitive data curation in accordance with the present invention. Many of the functional blocks 400, 425 may execute as background processes on various components, either in distributed computing components, or on the user device, or elsewhere.

Turning now to FIG. 4A, intelligent text font formatting service 410 is shown, incorporating processing unit 16 ("processors) and memory 28 of FIG. 1 to perform various computational, data processing and other functionality in accordance with various aspects of the present invention. The intelligent text font formatting service 410 may be provided by the computer system/server 12 of FIG. 1.

As one of ordinary skill in the art will appreciate, the depiction of the various functional units in the intelligent text font formatting service 410 is for purposes of illustration, as the functional units may be located within the intelligent text font formatting service 410 or elsewhere within and/or between distributed computing components.

The intelligent text font formatting service 410 may be in communication with and/or association with one or more computing devices 402 (e.g., an interne of things "IoT" computing device such as, for example, a smartphone, smartwatch, desktop computer, laptop computer, tablet, and/or another electronic device that may have one or more processors and memory and configured for capturing images or video data). The computing device 402 and the intelligent text font formatting service 410 may each be associated with and/or in communication with each other, by one or more communication methods, such as a computing network, wireless communication network, or other network means enabling communication.

In one aspect, the intelligent text font formatting service 410 may provide virtualized computing services (i.e., virtualized computing, virtualized storage, virtualized networking, etc.) to the one or more computing device 402. More specifically, the intelligent text font formatting service 410 may provide, and/or be included in, a virtualized computing, virtualized storage, virtualized networking and other virtualized services that are executing on a hardware substrate.

The intelligent text font formatting service 410 may also function as a database and/or service that may store, maintain, and update data, services, and/or resources internal to and/or external to a cloud computing environment such as described in FIG. 2. In one aspect, intelligent text font formatting service 410 may assist in providing access to and/or assist in performing one or more various types of data, services and/or resources. In one aspect, the intelligent text font formatting service 410 may provide an intelligent text font component 440, an application component 450, an analysis component 460, a feedback component 470, and a machine learning component 480.

The application component 450 may open one or more types of applications for communicating a message to one or more persons. The applications of the application component 450 may be enabled to perform a multimedia messaging, Short Message Service (SMS), social networking (e.g., social media communication of a social media account), audio or video social network sharing, an Instant Messaging (IM), E-mail, or other peer-to-peer communication operations. In short, the application component 450 provides a variety of types of applications having a variety of types of text fonts usable with the SMS, social media account, IM, E-mail, or other peer-to-peer communication applications.

The analysis component 460, in association with the machine learning component 480, may analyze text data (e.g., text font of the text data) using a natural language processing (NLP) to identify one or more contextual factors in a communication prior to the user of the computing device 402 sending the communication to another parting using one of a plurality of applications from the application component 450.

The analysis component 460, in association with the intelligent text font component 440, may consider, determine, interpret, and/or analyze biometric data/facial recognition or expressions of a user to determine a mood/tone of the user while the user is creating/typing a message. For example, if a user is frowning, the analysis component 460, in association with the machine learning component 480, may analyze and determine the emotion/mood/tone/sentiment of the user as being a negative emotion/mood/tone/sentiment (e.g., sad, unhappy, frustrated, angry, etc.). As such, the intelligent text font component 440, in association with the analysis component 460, may cognitively determine to use a selected font associated with the determined negative emotion/mood/tone/sentiment such as, for example, a bold text font.

The intelligent text font component 440 may interpret one or more contextual factors relating to text data in a communication prior to the user sending the communication to one or more persons using one of a plurality of applications. Pursuant to interpreting the one or more contextual factors, the intelligent text font component 440 may interpret a tone, a sentiment, facial expressions/recognition/biometric data of a user, keywords, a type of text font, or a combination thereof of the contextual factors in view of the communications. For example, the intelligent text font component 440 may perform a facial expression analysis, facial recognition analysis, and/or biometric analysis operation to determine and/or interpret a tone/sentiment/emotion based on the facial expression analysis, facial recognition analysis, and/or biometric analysis information/results. For example, if a tone/sentiment/emotion does not match a user's facial expression/biometric data, the particular text font is determined as inappropriate/not matching.

The intelligent text font component 440 may automatically suggest a text font matching the one or more contextual factors in the communication. The suggested text font may be applied to the text data, media data, a document, or combination thereof in the communication for one of the plurality of applications. The text font of the current text data may be enhanced, replaced, updated, and/or formatted with the suggested text font according to the one or more contextual factors. Also, one or more photographs, audio data, video data, emojis, or a combination thereof may also be suggested and/or provided with the suggested text font.

Thus, in operation, the intelligent text font component 440 provides for automatic text font selection on one or more types of applications (e.g., a social media, email application, text message application) for a user's creative communications (e.g., social media post, email, IM, peer-to-peer communication, etc.).

The feedback component 470 may collect feedback information from a user of computing device 402 in relation to the suggested text font. The feedback information may include, for example, a user's acceptance or rejection of the suggested text font and/or the suggested photographs, audio data, video data, and/or emojis that was also provided with the suggested text font.

The machine learning component 480 may be initialized to use the feedback information to learn user preferences and interests and update, replace, or enhance the text data using the suggested text font.

In operation, for example, assume a user of computing device 402 opens a multimedia messaging application. Using computing device 402, the user takes a photograph and/or video of the user's dog named "Apple." The user writes a caption on the photograph "Apple is the most beautiful dog I have ever seen." The intelligent text font component 440 and/or the analysis component 460 may analyze the text of the caption to identify the tone and sentiment of the caption. According to the analysis, the intelligent text font component 440 may suggest a whimsical, cursive font for the caption. The caption may be changed or updated to the suggested font for the caption. With the updated text font in the communication message, the user may send the communication with the updated text font to other parties (e.g., sending the SMS text message with the suggested text font in the new text font service). Feedback data may be learned using the intelligent text font formatting service 410 and the learned or collected feedback data may be communicated back to the intelligent text font formatting service 410.

Turning now to FIG. 4B, consider the additional example. Assume a user of computing device 402 has previously visited a particular or favorite 5-star dinner restaurant and previously sent a customized communication message with a favorite text font of text data of a customized communication message. Assume now that user takes another picture of the favorite 5-star dinner restaurant, opens an application and writes a communication message "We are so classy" as the caption of the message. The user of the computing device 402 may use a default text font and write the selected text (e.g., "We are so classy"). The intelligent text font component 440 may automatically select, create, suggest the text font for the communication in a desirable cursive font.

More specifically, the intelligent text font component 440, in association with the machine learning component 480, learns and identifies the text data in the text data. The intelligent text font component 440, in association with the machine learning component 480, may also learn and identify that the current photograph in the communication message is similar to a previously captured photograph. The intelligent text font component 440, in association with the machine learning component 480, may dynamically provide a notification to the user on computer device 402 that indicates, for example, "Would you like to use your favorite text font that you used last month when you were at this same 5-star dinner restaurant?" One or more selection buttons (e.g., "YES" or "NO") may be provided to receive user feedback relating to the suggested text font. Alternatively, an interactive voice dialog may be used to receive user feedback relating to the suggested text font. For example, the user of computing device 402 may select yes and the favorite text (which is the suggested text font) may be used as the text font in the caption. Alternatively, if the user selects "NO" the intelligent text font component 440, in association with the machine learning component 480, may dynamically suggest an alternative text font according to the learned tone or sentiment of the text.

In this way, the intelligent text font formatting service 410 enables the user of a computing device to avoid having to scroll through a list of text fonts until a preferred text font is located. The intelligent text font formatting service 410 predicts a text font that matches a emotion/mood/tone/sentiment or other contextual factors of the text data and/or communication itself. In short, the intelligent text font formatting service 410 predicts text fonts based on natural language and text and customizes and automates the text font selection process for one or more application types that provide for communication with one or more parties.

In one aspect, a machine learning component 480 may be initialized to learn a type of text font data preferred by a user and/or learn one or more contextual factors (e.g., a tone, emotional state, a sentiment, and/or feeling associated with a communication). The machine learning component 480 may continuously and automatically receive from one or more computing devices, such as computing devices 402, feedback according to intelligent text font formatting service 410 applications for each user.

In one aspect, the machine learning component 480 may identify a emotion/mood/tone/sentiment of the text and/or background of communication and maintain a mood-to-font modifications mapping repository. Based on the emotion/mood/tone/sentiment identified and/or selected, the intelligent text font component 440, in association with the machine learning component 480, may select a type/color/format to match the emotion/mood/tone/sentiment and those word(s) that need to be qualified with special selected formatting may be modified (e.g., a message that states "I do not like it" may only have the "not" being modified). The intelligent text font component 440, in association with the machine learning component 480, may provide the modified text to the sender/user prior to transmitting/communicated a message. If the sender/user corrects/updates the modified text font, the intelligent text font component 440, in association with the machine learning component 480, may add the corrected/updated modified text to a training model for automated machine learning for one or more text font matching rules.

Furthermore, the machine learning component 480 may collect and learn behavioral data over a course of a selected time period to assist with suggesting one or text fonts. The machine learning component 480 may include using one or more heuristics and machine learning based models for performing one or more of the various aspects as described herein. In one aspect, the IoT device compliance service and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

Figure 5:
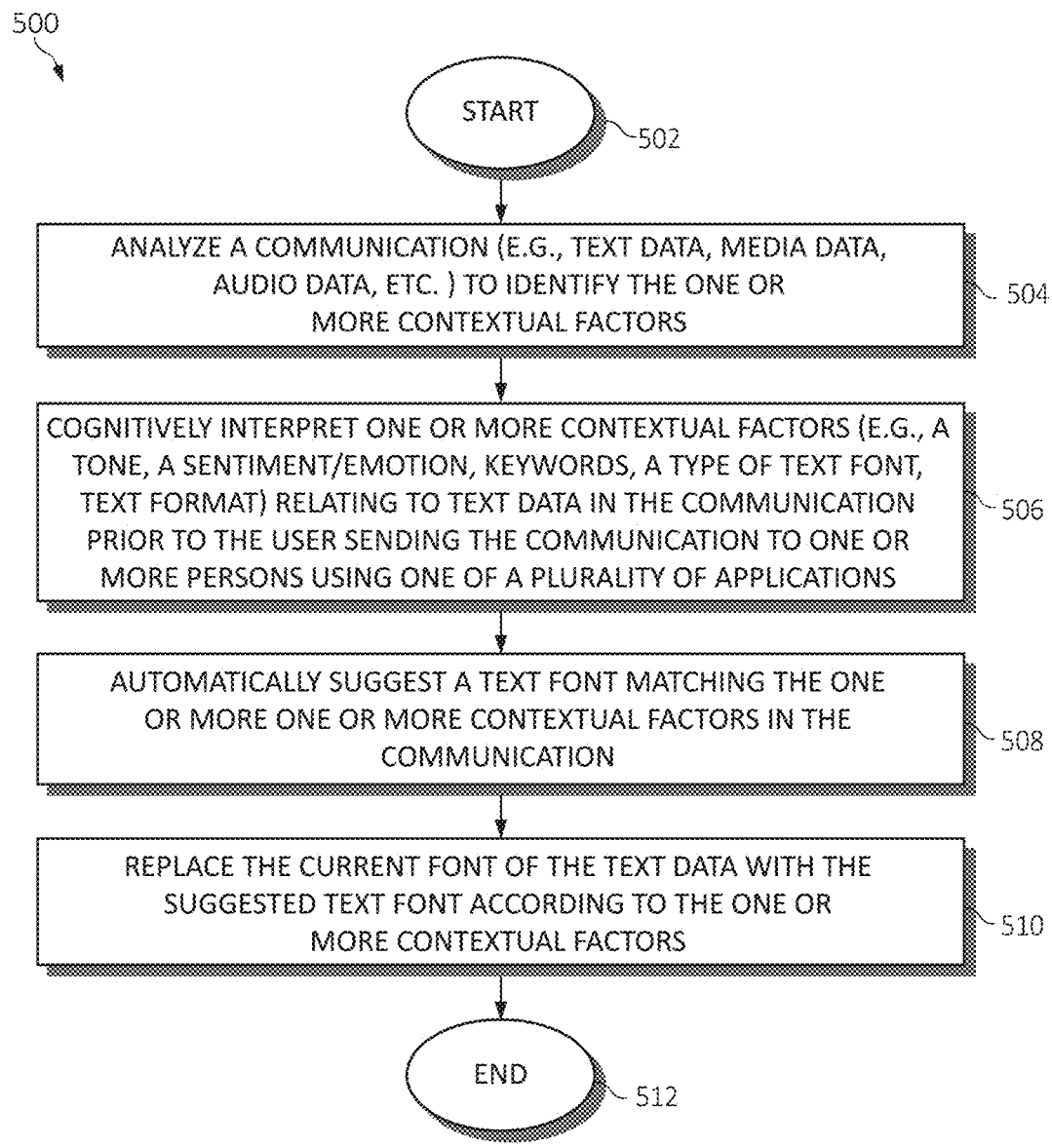
FIG. 5 is an additional flowchart diagram depicting an exemplary method for intelligent text font formatting in a computing environment by a processor, again in which aspects of the present invention may be realized.

Turning now to FIG. 5, a method 500 for intelligent text font formatting in an Internet of Things (IoT) computing environment is depicted, in which various aspects of the illustrated embodiments may be implemented. The various functions, components, and descriptions of FIGS. 1-4A-4B may be included in FIG. 5. The functionality 500 may be implemented as a method executed as instructions on a machine, where the instructions are included on at least one computer readable medium or on a non-transitory machine-readable storage medium. The functionality 500 may start in block 502.

A communication e.g., email, social media post or message, document, text message, etc.) may be analyzed to identify one or more contextual factors, as in block 504. The one or more contextual factors (e.g., a tone, a sentiment/emotion, facial recognition/biometric data, keywords, a type of text font, text format) relating to text data in the communication may be cognitively interpreted prior to sending the communication to one or more persons using one of a plurality of applications, as in block 506. One or more text data characteristics (e.g., a text font, photographs, audio data, video data, emojis, or a combination thereof) matching the one or more contextual factors in the communication may be automatically suggested, as in block 508. At least a portion of the text data may be replaced with the suggested text data characteristics according to the one or more contextual factors, as in block 510. For example, current font of the text data may be replaced with suggested text font according to the one or more contextual factors. The functionality 500 may end in block 512.

In one aspect, in conjunction with and/or as part of at least one block of FIG. 5, the operations of method 500 may include each of the following. The operations of method 500 may analyze text data in the communication using a natural language processing (NLP) to identify the one or more contextual factors. The operations of method 500 may interpret the one or more contextual interpreting by interpreting a tone, a sentiment, facial recognition/biometric data, keywords, a type of text font, or a combination thereof of the contextual factors in view of the communications.

The operations of method 500 may apply the suggested one or more text data characteristics to the text data, media data, a document, or combination thereof in the communication for one of the plurality of applications. The operations of method 500 may also suggest one or more photographs, audio data, video data, emojis, or a combination thereof. Feedback information may be collected from a user in relation to the suggested one or more text data characteristics (e.g., suggested text font). A machine learning component may be initialized to use the feedback information to learn user preferences and interests, update, replace, or enhance the text data using the suggested text font, perform a correction or override operation on the suggested one or more text data characteristics (e.g., suggested text font), or perform a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for intelligent text enhancement in a computing environment, comprising:
   interpreting one or more contextual factors relating to text data in a body of a current communication prior to a user sending the current communication to a predefined one or more persons using one of a plurality of applications;
   determining, as a particular one of the contextual factors and prior to the user sending the current communication, that the current communication includes an attachment of one or more images associated with the text data, wherein specific textual characteristics are applied to the text data;
   responsive to determining that the current communication includes the one or more images, identifying particular textual characteristics applied to text data of a previous communication when one or more images attached to the previous communication are matched as the particular one of the contextual factors for being related to the one or more images in the current communication; and
   automatically suggesting, prior to the user sending the communication and based on the one or more contextual factors, at least the identified particular textual characteristics from the previous communication that matched the particular one of the contextual factors of the current communication, wherein selection of the suggestion being based on the particular one of the contextual factors applies the identified particular textual characteristics in place of the specific textual characteristics in the current communication.

2. The method of claim 1, wherein interpreting the one or more contextual factors further includes interpreting a tone, biometric data of the user, facial recognition or expressions of the user, a sentiment, keywords, a type of text font, or a combination thereof.

3. The method of claim 1, further including analyzing the text data using a natural language processing (NLP) to identify the one or more contextual factors.

4. The method of claim 1, further including, in conjunction with automatically suggesting at least the identified particular textual characteristics, suggesting one or more text fonts, photographs, audio data, video data, emojis, or a combination thereof.

5. The method of claim 1, further including:
   collecting feedback information from the user in relation to the suggested identified particular textual characteristics; and
   initializing a machine learning component to use the feedback information to learn user preferences and interests, update, or enhance the text data using the suggested identified particular textual characteristics, learning a preferred text font relating to the suggested identified particular textual characteristics, perform a correction or override operation on the suggested text font, or perform a combination thereof.

6. A system for intelligent text enhancement in an Internet of Things (loT) computing environment, comprising:
   a hardware processor; and
   a memory device storing executable instructions, executed by the hardware processor, that when executed cause the system to:
   interpret one or more contextual factors relating to text data in a body of a current communication prior to a user sending the current communication to a predefined one or more persons using one of a plurality of applications;
   determine, as a particular one of the contextual factors and prior to the user sending the current communication, that the current communication includes an attachment of one or more images associated with the text data, wherein specific textual characteristics are applied to the text data;
   responsive to determining that the current communication includes the one or more images, identify particular textual characteristics applied to text data of a previous communication when one or more images attached to the previous communication are matched as the particular one of the contextual factors for being related to the one or more images in the current communication; and
   automatically suggest, prior to the user sending the communication and based on the one or more contextual factors, at least the identified particular textual characteristics from the previous communication that matched the particular one of the contextual factors of the current communication, wherein selection of the suggestion being based on the particular one of the contextual factors applies the identified particular textual characteristics in place of the specific textual characteristics in the current communication.

7. The system of claim 6, wherein the executable instructions, pursuant to interpreting the one or more contextual factors, further interpret a tone, biometric data of the user, facial recognition or expressions of the user, a sentiment, keywords, a type of text font, or a combination thereof.

8. The system of claim 6, wherein the executable instructions further analyze the text data using a natural language processing (NLP) to identify the one or more contextual factors.

9. The system of claim 6, wherein the executable instructions, in conjunction with automatically suggesting at least the identified particular textual characteristics, further suggest one or more text fonts, photographs, audio data, video data, emojis, or a combination thereof.

10. The system of claim 6, wherein the executable instructions further:
    collect feedback information from the user in relation to the suggested identified particular textual characteristics; and
    initialize a machine learning component to use the feedback information to learn user preferences and interests, update, or enhance the text data using the suggested identified particular textual characteristics, learning a preferred text font relating to the suggested identified particular textual characteristics, perform a correction or override operation on the suggested text font, or perform a combination thereof.

11. A computer program product for intelligent text enhancement by a processor, the computer program product comprising a non-transitory computer-readable storage medium having computer-readable program code portions stored therein, the computer-readable program code portions comprising:
    an executable portion that interprets one or more contextual factors relating to text data in a body of a current communication prior to a user sending the current communication to a predefined one or more persons using one of a plurality of applications;

an executable portion that determines, as a particular one of the contextual factors and prior to the user sending the current communication, that the current communication includes an attachment of one or more images associated with the text data, wherein specific textual characteristics are applied to the text data;

an executable portion that, responsive to determining that the current communication includes the one or more images, identifies particular textual characteristics applied to text data of a previous communication when one or more images attached to the previous communication are matched as the particular one of the contextual factors for being related to the one or more images in the current communication; and an executable portion that automatically suggests, prior to the user sending the communication and based on the one or more contextual factors, at least the identified particular textual characteristics from the previous communication that matched the particular one of the contextual factors of the current communication, wherein selection of the suggestion being based on the particular one of the contextual factors applies the identified particular textual characteristics in place of the specific textual characteristics in the current communication one or more text data characteristics matching the one or more contextual factors in the communication.

12. The computer program product of claim 11, further including an executable portion that, pursuant to interpreting one or more contextual factors, interprets a tone, biometric data of the user, facial recognition or expressions of the user, a sentiment, keywords, a type of text font, or a combination thereof.

13. The computer program product of claim 11, further including an executable portion that analyzes the text data using a natural language processing (NLP) to identify the one or more contextual factors.

14. The computer program product of claim 11, further including an executable portion that, in conjunction with automatically suggesting at least the identified particular textual characteristics, suggests one or more text fonts, photographs, audio data, video data, emojis, or a combination thereof.

15. The computer program product of claim 11, further including an executable portion that:
  collects feedback information from the user in relation to the suggested identified particular textual characteristics; and initializes a machine learning component to use the feedback information to learn user preferences and interests, update, or enhance the text data using the suggested identified particular textual characteristics, learning a preferred text font relating to the suggested identified particular textual characteristics, perform a correction or override operation on the suggested text font, or perform a combination thereof.

* * * * *